United States Patent
Zhang et al.

(10) Patent No.: US 11,005,786 B2
(45) Date of Patent: May 11, 2021

(54) KNOWLEDGE-DRIVEN DIALOG SUPPORT CONVERSATION SYSTEM

(71) Applicant: Microsoft Technology Licensing, LLC, Redmond, WA (US)

(72) Inventors: Jianwen Zhang, Sammamish, WA (US); Shichao Hu, Bellevue, WA (US); Jiayuan Huang, Bellevue, WA (US); Jiantao Sun, Bellevue, WA (US); Zheng Chen, Bellevue, WA (US); Yi-Min Wang, Redmond, WA (US); Changhong Yuan, Sammamish, WA (US); Mingyu Wang, Sammamish, WA (US); Yuangang Tu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 16/022,326

(22) Filed: Jun. 28, 2018

(65) Prior Publication Data
US 2020/0007474 A1   Jan. 2, 2020

(51) Int. Cl.
*H04L 12/58* (2006.01)
*G06F 40/20* (2020.01)
(Continued)

(52) U.S. Cl.
CPC .............. *H04L 51/02* (2013.01); *G06F 40/20* (2020.01); *G09B 5/02* (2013.01); *G09B 7/02* (2013.01); *G09B 7/06* (2013.01); *G09B 19/0053* (2013.01)

(58) Field of Classification Search
None
See application file for complete search history.

(56) References Cited

U.S. PATENT DOCUMENTS 6,963,831 B1   11/2005   Epstein et al.
8,204,751 B1   6/2012   Di Fabbrizio et al.
(Continued)

FOREIGN PATENT DOCUMENTS

WO       0209399 A2    1/2002

OTHER PUBLICATIONS

"Non Final Office Action Issued in U.S. Appl. No. 16/022,355", dated Dec. 31, 2019, 9 Pages.
(Continued)

*Primary Examiner* — Nathan Hillery
(74) *Attorney, Agent, or Firm* — Schwegman Lundberg & Woessner, P.A.

(57) ABSTRACT

Systems and devices to perform knowledge-driven dynamic conversations and select content within automated agents such as chatbots and virtual assistants are disclosed. In an example, operations to facilitate a knowledge-based conversation session with a human user using an automated agent include: receiving a conversational input regarding a support issue; analyzing the conversational input to determine an intent and applicable entity properties associated with the intent; performing a multi-turn conversation to identify a solution using the intent and the applicable entity properties, by exchanging iterative questions and answers between the automated agent and the user to dynamically recalculate applicability of the solution to the support issue; and outputting information associated with the identified solution. In further examples, the operations include a dynamic application of a solution policy and a diagnosis policy in the multi-turn conversation, to determine whether to deliver a solution or ask diagnosis questions.

20 Claims, 11 Drawing Sheets

(51) Int. Cl.
  *G09B 5/02* (2006.01)
  *G09B 7/02* (2006.01)
  *G09B 7/06* (2006.01)
  *G09B 19/00* (2006.01)

(56) References Cited

U.S. PATENT DOCUMENTS

| | | | |
|---|---|---|---|
| 9,495,331 | B2 | 11/2016 | Govrin et al. |
| 9,785,715 | B1 | 10/2017 | Busey et al. |
| 9,812,151 | B1 | 11/2017 | Amini et al. |
| 2002/0116351 | A1 | 8/2002 | Skaanning et al. |
| 2003/0014260 | A1 | 1/2003 | Coffman et al. |
| 2004/0044542 | A1* | 3/2004 | Beniaminy ............ G06N 5/022 706/45 |
| 2006/0080130 | A1* | 4/2006 | Choksi ................. G06Q 99/00 705/1.1 |
| 2008/0147789 | A1* | 6/2008 | Wing ..................... G06Q 10/06 709/203 |
| 2008/0255881 | A1* | 10/2008 | Bone ...................... G06Q 10/00 705/3 |
| 2009/0018829 | A1 | 1/2009 | Kuperstein |
| 2009/0228264 | A1* | 9/2009 | Williams ............ H04M 3/5166 704/9 |
| 2012/0089394 | A1 | 4/2012 | Teodosiu et al. |
| 2014/0255895 | A1* | 9/2014 | Shaffer ................... G09B 7/02 434/350 |
| 2014/0297268 | A1* | 10/2014 | Govrin ..................... G06N 5/04 704/9 |
| 2015/0142704 | A1 | 5/2015 | London |
| 2015/0286886 | A1 | 10/2015 | Wimmer et al. |
| 2015/0317302 | A1 | 11/2015 | Liu et al. |
| 2015/0370787 | A1 | 12/2015 | Akbacak et al. |
| 2016/0294621 | A1* | 10/2016 | Werth .................... G06F 9/453 |
| 2016/0343001 | A1* | 11/2016 | Hawes ................. G06F 3/0482 |
| 2017/0024912 | A1 | 1/2017 | de Castro Alves et al. |
| 2017/0032273 | A1 | 2/2017 | Ho et al. |
| 2017/0070478 | A1 | 3/2017 | Park et al. |
| 2017/0317949 | A1 | 11/2017 | Aharonov et al. |
| 2018/0052885 | A1 | 2/2018 | Gaskill et al. |
| 2018/0053119 | A1* | 2/2018 | Zeng ..................... G06N 20/00 |
| 2018/0082184 | A1 | 3/2018 | Guo et al. |
| 2018/0174055 | A1* | 6/2018 | Tirumale ............... G06Q 10/10 |
| 2018/0278554 | A1 | 9/2018 | Kassabgi |
| 2019/0042988 | A1* | 2/2019 | Brown ............... G06Q 10/0631 |
| 2019/0243899 | A1* | 8/2019 | Yi .......................... G06N 20/00 |
| 2019/0272316 | A1* | 9/2019 | Ben Ami ................ G06N 3/08 |
| 2019/0362642 | A1 | 11/2019 | Dhamecha et al. |
| 2020/0005117 | A1 | 1/2020 | Yuan et al. |
| 2020/0005118 | A1 | 1/2020 | Chen et al. |
| 2020/0005503 | A1 | 1/2020 | He et al. |
| 2020/0007380 | A1 | 1/2020 | Chen et al. |
| 2020/0143265 | A1* | 5/2020 | Jonnalagadda ...... G06N 3/0454 |

OTHER PUBLICATIONS

"International Search Report and Written Opinion Issued in PCT Application No. PCT/US19/038356", dated Aug. 21, 2019, 11 Pages.

"Notice of Allowance Issued in U.S. Appl. No. 16/022,362", dated Oct. 25, 2019, 9 Pages.

"International Search Report and Written Opinion Issued in PCT Application No. PCT/US19/038355", dated Jul. 25, 2019, 11 Pages.

Hashemi, et al., "Query Intent Detection using Convolutional Neural Networks", In International Conference on Web Search and Data Mining, Workshop on Query Understanding, Feb. 22, 2016, 5 Pages.

"International Search Report and Written Opinion Issued in PCT Application No. PCT/US2019/038358", dated Sep. 18, 2019, 14 Pages.

"International Search Report and Written Opinion Issued in PCT Application No. PCT/US2019/38530", dated Oct. 2, 2019, 11 Pages.

"International Search Report and Written Opinion Issued in PCT Application No. PCT/US2019/38542", dated Sep. 13, 2019, 11 Pages.

Ruotsalo, et al., "Interactive Intent Modeling: Information Discovery Beyond Search", In Journal of Communications of the ACM, vol. 58, Issue 1, Jan. 1, 2015, pp. 86-92.

Li, et al., "Personal Knowledge Graph Population from User Utterances in Conversational Understanding", In Proceedings of the IEEE Spoken Language Technology Workshop, Dec. 7, 2014, pp. 224-229.

"Non Final Office Action Issued in U.S. Appl. No. 16/022,336", dated Sep. 4, 2020, 25 Pages.

"Final Office Action Issued in U.S. Appl. No. 16/022,336", dated Feb. 25, 2021, 25 Pages.

\* cited by examiner

Forget password of Windows 10

SOLUTION POLICY:

| ID | Solutions | Score |
|----|-----------|-------|
| 1 | Forget password of windows 10 | 0.95 |
| 2 | Forget password of windows 7 | 0.2 |
| 3 | Reset password for Microsoft account | 0.15 |
| 4 | ... | |
| n | How to upgrade to windows 10 | 0.10 |

Virtual Agent Support     Start Over

Windows 10

What to do if you forget your Windows password

If you don't remember your Windows password, there are a few things you can try:

- If your PC is on a domain, your organization's support person can reset your password
- If you're using a local account, try using the password hint as a reminder.
- If you still can't sign in, you might need to reinstall Windows.

Did this solve the problem?

*Enter your response here*

FIG. 4D

KNOWLEDGE-DRIVEN DIALOG SUPPORT CONVERSATION SYSTEM

RELATED APPLICATIONS

This application is related to U.S. patent application Ser. No. 16/022,317 titled "ARTIFICIAL INTELLIGENCE ASSISTED CONTENT AUTHORING FOR AUTOMATED AGENTS" and filed on Jun. 28, 2018, U.S. patent application Ser. No. 16/022,336 titled "OFFTRACK VIRTUAL AGENT INTERACTION SESSION DETECTION" and filed on Jun. 28, 2018, U.S. patent application Ser. No. 16/022,355 titled "CONTEXT-AWARE OPTION SELECTION IN VIRTUAL AGENT" and filed on Jun. 28, 2018, and U.S. patent application Ser. No. 16/022,362 titled "VISUALIZATION OF USER INTENT IN VIRTUAL AGENT INTERACTION" and filed on Jun. 28, 2018, now issued as U.S. Pat. No. 10,580,176, on Mar. 3, 2020, the contents of each of which are incorporated herein by reference in their entirety.

BACKGROUND

Automated agents such as chatbots, avatars, and voice assistants, also known as "virtual" agents, play an increasing role in human-to-computer interactions. As the sophistication and types of access to these automated agents has increased, so has the type of tasks that automated agents are being used with. One common form of virtual agent includes an automated agent that is designed to conduct a back-and-forth conversation with a human user, similar to a phone call or chat session. The conversation with the human user may have a purpose, such as to provide a user with a solution to a problem they are experiencing, and to provide some specific advice or perform an action in response to the conversation content.

One area in which automated virtual agents are expected to be increasingly deployed is in the area of support tasks traditionally performed by humans at call centers, such as customer support for product sales and technical support issues. Many forms of current virtual agents, however, often fail to meet user expectations or provide solutions for some support tasks, due to the large amount of possible questions, answers, responses, and types of user interactions that may be encountered for such support tasks.

Existing deployments of automated agents for customer support often rely on dialogue scripts to conduct agent-to-human interactions. For instance, one conventional approach involves an enterprise designing a series of questions and answers, to cause a chatbot to engage with the user and output a particular solution, in response to a question and answer sequence. However, if the user asks a question or provides an answer that is not expected, the chatbot is unlikely to be able to assist, even if the chatbot has a large library of known solutions. Another conventional approach involves the creation of a semantic machine learning model, to learn a variety of conversation pathways and solutions. However, the results from such models are not robust, typically because the conversation flow heavily depends on a dialogue script and the training inputs into such models.

Either conventional approach involves a large amount of manual work to author and maintain support knowledge for a usable dialogue script. As a result, significant time and effort must be expended by human editors to establish, curate, and expand the data set used by the automated agent, even as many customer questions or issues are not fully resolved.

SUMMARY

Various details for the embodiments of the inventive subject matter are provided in the accompanying drawings and in the detailed description text below. It will be understood that the following section provides summarized examples of some of these embodiments.

Embodiments described herein generally relate to automated and computer-based techniques, to conduct knowledge-driven, multi-turn conversations for chatbots and other types of automated agents. In particular, the following techniques utilize conversation models and other technological implementations in a knowledge-driven dialog (KDD) workflow, to intelligently provide and receive content for virtual agent conversations. In an example, embodiments of operations to facilitate a knowledge-based conversation session with a human user using an automated agent may include: receiving, from the human user in the conversation session, a conversational input regarding a support issue; analyzing the conversational input to determine an intent and applicable entity properties associated with the intent; performing a multi-turn conversation with the human user in the conversation session to identify a solution using the intent and the applicable entity properties, as the multi-turn conversation uses iterative questions and answers exchanged between the automated agent and the human user to dynamically recalculate applicability of the solution to the support issue; and outputting, to the human user in the conversation session, information associated with the identified solution.

In a further example, the embodiments may perform operations that direct the multi-turn conversation to obtain further conversational input from the human user, and to determine the intent from among a plurality of intents and the applicable entity properties from among a plurality of entities, and as information obtain from the multi-turn conversation is used to exclude other intents of the plurality of intents and other entity properties of the plurality of entities. In further examples, the embodiments may provide operations including use of a solution policy to identify at least two possible solutions from a plurality of solutions, based on scoring of the plurality of solutions, as the solution policy applies the scoring to exclude use of other solutions from the plurality of solutions, and as the multi-turn conversation provides diagnosis questions used to distinguish between the at least two possible solutions. Also in further examples, the embodiments may provide operations including applying a diagnosis policy to identify at least two possible diagnosis questions from a plurality of diagnosis questions, based on scoring of the plurality of diagnosis questions, as the diagnosis policy applies the scoring to exclude use of other diagnosis questions from the plurality of diagnosis questions.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described above, may be performed at a client computing system, a server computing system, or a distributed or networked system (and systems), including any number of form factors for the system such as desktop or notebook personal computers, mobile devices such as tablets, netbooks, and smartphones, client terminals, virtualized and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 4A to 4D depict user interfaces and data operations for identifying solutions and diagnoses, based on a conversation performed in a virtual agent, according to an example.

DETAILED DESCRIPTION

Figure 1:
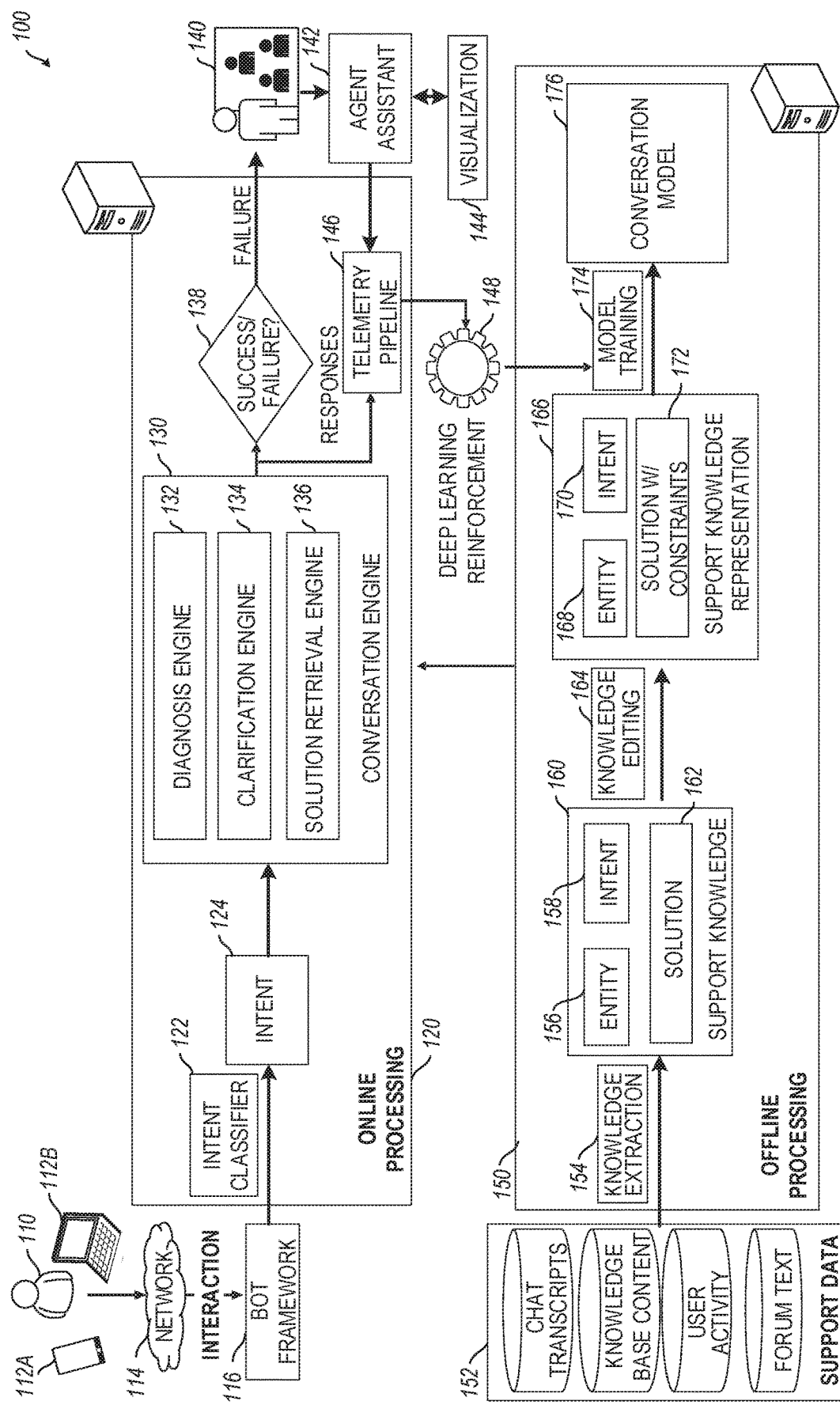
FIG. 1 depicts a diagram of a system architecture providing enhanced conversation capabilities in a virtual agent, according to an example.

In the following description, methods, configurations, and related apparatuses are disclosed to enable aspects of knowledge-driven dialog (KDD) operations in virtual agent interactions. These techniques include the use of conversation models generated from content sources such as customer chat logs, which enable a KDD system to dynamically decide questions to ask and solutions to provide in a human-agent conversation. Starting with the solution candidates, the KDD system also dynamically decides which clarification questions to ask to deliver the most appropriate response to the customer. The KDD system may also consider aspects of properties and constraints that lead to a solution, as dialog pathways are based on dynamic (and real-time) conversation engine decisions.

The content used in interactions is crucial for many human-facing automated agents. In particular, the scope and quality of content must be sufficient for technical support chat bots and other agents to efficiently and correctly solve end-users' problems. However, with existing systems, the process of content creation and curation for technical support purposes is time-consuming, highly dependent on skilled editors having domain knowledge, and produces ad-hoc results with inconsistent content quality. In addition, many technical challenges are involved to organize, authorize, track, store, and update content by both the agent and human editors, especially as content or issues change over time. Some studies have indicated that, on average, around one third of unsuccessful conversations with automated agents are caused by incomplete or wrong content.

The presently described content management techniques provide an effective and efficient framework to identify, select, and deliver content in a technical support scenario and a variety of other agent scenarios. The present information processing techniques include the construction and presentation of dialogs that are constructed from dynamic conversation engine decisions, and through the consideration of solutions, constraints, and other properties which are suitable for consumption by a virtual agent in a knowledge information service. This may occur in various examples where, for instance, the curation and delivery processes are separate (such as in offline model training and online model usage scenarios).

In the context of a technical support virtual agent, the present KDD approaches may address various technical problems introduced from coding 'dialog trees'. The present approaches may consume content from AI-assisted processes, modeled on unstructured customer-agent chat logs, to deliver machine pre-processed data that content editors can use to make data-supported decisions. Further, the present KDD approaches minimize the need for pre-authored dialog scripts and manual content authoring and curation. Starting with the solution candidates, the KDD system, rather than a fixed script, dynamically decides which clarification questions to ask to deliver the most appropriate response to the customer.

In an example, a technique for adding new content into a KDD-based conversation model may involve simple steps, starting from an author writing support content and defining relevant document properties. The properties and constraints are designed to lead to a solution for an intent, as the dialog flow in the conversation occurs dynamically. This provides a far simpler approach than found in conventional dialog script authoring, which relies on pre-fixed flows, and an ongoing coordination of curation and delivery processes.

The techniques discussed herein may be used to provide outputs of conversational data in a variety of forms, including web page contents, documentation and user manuals text, knowledge base articles, internet data services, or the like. Thus, in contrast to existing approaches that require extensive conversation scripts or a large number of rules and exceptions, the presently disclosed techniques enable a large set of content to be narrowed down based on the specific intent of the conversation and properties relevant to the conversation. As non-limiting examples, the KDD techniques may be used to provide technical support for a variety of products and services, including electronic products such as software. Other types of recommendations and results are also illustrated.

The techniques discussed herein may produce an enhanced form of data analysis with an accompanying benefit in the technical processes performed in computer and information systems, and computer-human interfaces. These benefits may include: improved responsiveness and interaction sequences involving automated agents; improved accuracy and precision of information retrieval and presentation activities; increased speed for the analysis of data records; fewer data transactions and agent interactions, resulting in savings of processing, network, and memory resources; and data organizational benefits as data is more accurately catalogued, organized, and delivered. Such benefits may be achieved with accompanying improvements in technical operations in the computer system itself (including improved operations with processor, memory, bandwidth, storage, or other computing system resources). Further, such benefits may also be used to initiate or trigger other dynamic computer activities, leading to further technical benefits and improvements with electronic operational systems.

FIG. 1 is a diagram illustrating an example system architecture 100 providing enhanced conversation capabilities in a virtual agent. The present techniques for KDD conversations may be implemented at a number of different locations in the system architecture 100, including in conversation engine 130 and the accompanying diagnosis engine 132, clarification engine 134, and solution retrieval engine 136, and as part of using support data 152, candidate support knowledge set 160, support knowledge representation data set 166, conversation model 176, and other aspects of data used in offline processing system 150 or online processing system 120, as discussed in the following paragraphs. As used herein, such "online" processing generally refers to processing capabilities to provide the user an experience while online (e.g., in real time, while actively using the automated agent or the computing device, such as in a KDD-enhanced conversation); whereas such "offline" processing generally refers to processing capabilities to provide the user with data and capabilities at a later time (e.g., not in real time). Accordingly, online versus offline processing may be distinguishable in time, resources, and applicable workflows.

The system architecture 100 illustrates an example scenario in which a human user 110 conducts an interaction with a virtual agent online processing system 120. The human user 110 may directly or indirectly conduct the interaction via an electronic input/output device, such as within an interface device provided by a mobile device 112A or a personal computing device 112B. The human-to-agent interaction may take the form of one or more text (e.g., a chat session), graphics (e.g., a video conference), or audio (e.g., a voice conversation). Other forms of electronic devices (e.g., smart speakers, wearables, etc.) may provide an interface for the human-to-agent interaction or related content. The interaction that is captured and output via the device(s) 112A, 112B, may be communicated to a bot framework 116 via a network. For instance, the bot framework 116 may provide a standardized interface in which a conversation can be carried out between the virtual agent and the human user 110 (such as in a textual chat bot interface). The bot framework 116 may also enable conversations to occur through information services and user interfaces exposed by search engines, operating systems, software applications, webpages, and the like.

The conversation input and output are provided to and from the virtual agent online processing system 120, and conversation content is parsed and output with the system 120 through the use of a conversation engine 130. The conversation engine 130 may include components that assist in identifying, extracting, outputting, and directing the human-agent conversation and related conversation content. The conversation engine 130 uses its engines 132, 134, 136 to process user input and decide what solutions constraints are matched or violated. Such processing is help decide the final bot response: to ask questions or deliver solutions, and identify which question/solution to deliver.

As depicted, the conversation engine 130 includes: a diagnosis engine 132 used to extract structured data from user inputs (such as entity, intent, and other properties) and assist with the selection of a diagnosis (e.g., a problem identification); a clarification engine 134 used to deliver questions to ask, to obtain additional information from incomplete, ambiguous, or unclear user conversation inputs, or to determine how to respond to a human user after receiving an unexpected response from the human user; and a solution retrieval engine 136 used to rank and decide candidate solutions, and select and output a particular candidate solution or sets of candidate solutions, as part of a technical support conversation. Thus, in the operation of a typical human-agent interaction via a chatbot, various human-agent text is exchanged between the bot framework 116 and the conversation engine 130.

In some examples, the conversation engine 130 selects a particular solution with the solution retrieval engine 136, or selects a clarification statement with the clarification engine 134, or selects a particular diagnosis with the diagnosis engine, based on real-time scoring relative to the current intent 124 and a current state of the conversation. This scoring may be used to track a likelihood of a particular solution and a likelihood of a particular diagnosis, at any given time. For instance, the scoring may be based on multiple factors such as, (a) measuring the similarity between the constraints or previous history of solution and diagnosis with current intent, conversation and context; and (b) the popularity of solution or diagnosis based on history data.

The virtual agent online processing system 120 involves the use of intent processing, as conversational input received via the bot framework 116 is classified into an intent 124 using an intent classifier 122. As discussed herein, an intent refers to a specific type of issue, task, or problem to be resolved in a conversation, such as an intent to resolve an account sign-in problem, or an intent to reset a password, or an intent to cancel a subscription, or the like. For instance, as part of the human-agent interaction in a chatbot, text captured by the bot framework 116 is provided to the intent classifier 122. The intent classifier 122 identifies at least one intent 124 to guide the conversation and the operations of the conversation engine 130. The intent can be used to identify the dialog script that defines the conversation flow, as solutions and discussion in the conversation attempts to address the identified intent. The conversation engine 130 provides responses and other content according to a knowledge set used in a conversation model, such as a conversation model 176 that can be developed using an offline processing technique discussed below.

The virtual agent online processing system 120 may be integrated with feedback and assistance mechanisms, to address unexpected scenarios and to improve the function of the virtual agent for subsequent operations. For instance, if the conversation engine 130 is not able to guide the human user 110 to a particular solution, an evaluation 138 may be performed to escalate the interaction session to a team of human agents 140 who can provide human agent assistance 142. The human agent assistance 142 may be integrated with aspects of visualization 144, such as to identify conversation workflow issues, or understand how an intent is linked to a large or small number of proposed solutions.

The conversation model 176 employed by the conversation engine 130 may be developed through use of a virtual agent offline processing system 150. The conversation model 176 may include any number of questions, answers, or constraints, as part of generating conversation data. Specifically, FIG. 1 illustrates the generation of a conversation model 176 as part of a support conversation knowledge scenario, where a human-virtual agent conversation is used for satisfying an intent with a customer support purpose. The purpose may include technical issue assistance, requesting an action be performed, or another inquiry or command for assistance.

The virtual agent offline processing system 150 may generate the conversation model 176 to support the KDD processes and system discussed herein. The conversation model 176 may be generated from a variety of support data 152, such as chat transcripts, knowledge base content, user activity, web page text (e.g., from web page forums), and other forms of unstructured content. This support data 152 is provided to a knowledge extraction engine 154, which produces a candidate support knowledge set 160. The candidate support knowledge set 160 links each candidate solution 162 with an entity 156 and an intent 158. The knowledge extraction engine 154 and the creation of a candidate support knowledge set 160 may occur using various artificial intelligence (AI)-assisted authoring techniques, such as with machine learning classifiers. Although the present examples are provided with reference to support data in a customer service context, it will be understood that the conversation model 176 may be produced from other types of input data and other types of data sources.

The candidate support knowledge set 160 is further processed as part of a knowledge editing process 164, which is used to produce a support knowledge representation data set 166. The support knowledge representation data set 166 also links each identified solution 172 with at least one entity 168 and at least one intent 170, and defines the identified solution 172 with constraints. For example, a human editor may define constraints such as conditions or requirements for the applicability of a particular intent or solution; such constraints may also be developed as part of automated, computer-assisted, or human-controlled techniques in the offline processing (such as with the model training 174 or the knowledge editing process 164).

In an example, editors and business entities may utilize the knowledge editing process 164 to review and approve business knowledge and solution constraints, to ensure that the information used by the agent is correct and will result in correct responses. As an example of business knowledge, consider a customer support bot designed for a business; the business knowledge may include a specific return policy, such as for a retail store which has different return policies for products purchased from local store and online. As an example of solution constraints, consider a scenario where business owners review the scope of customer requests handled by the bot, to review the list of intents and exclude some of them from being handled by the bot; such a constraint could prevent a customer from requesting cash back (or conduct some other unauthorized action) in connection with a promotional program.

In an example, an entity may be a keyword or other tracked value that impacts the flow of the conversation. For example, if an end user intent is, "printer is not working", a virtual agent may ask for a printer model and operating system to receive example replies such as "S7135" and "Windows". In this scenario, "printer", "S7135" and "Windows" are entities. As an example, an intent may represent the categorization of users' questions, issues, or things to do. For example, an intent may be in the form of, "Windows 10 upgrade issue", "How do I update my credit card?", or the like. As an example, a solution may include or define a concrete description to answer or solve a users' question or issue. For example, "To upgrade to Windows 10, please follow these steps: 1) backup your data, . . . 2) Download the installer, . . . , 3) Provide installation information, . . . ", etc.

Based on inputs provided by the candidate support knowledge set 160, model training 174 may be used to generate the resulting conversation model 176. This conversation model 176 may be deployed in the conversation engine 130, for example, and used in the online processing system 120. The various responses received in the conversation of the online processing may also be used as part of a telemetry pipeline 146, which provides a deep learning reinforcement 148 of the responses and response outcomes in the conversation model 176. Accordingly, in addition to the offline training, the reinforcement 148 may provide an online-responsive training mechanism for further updating and improvement of the conversation model 176.

Figure 2:
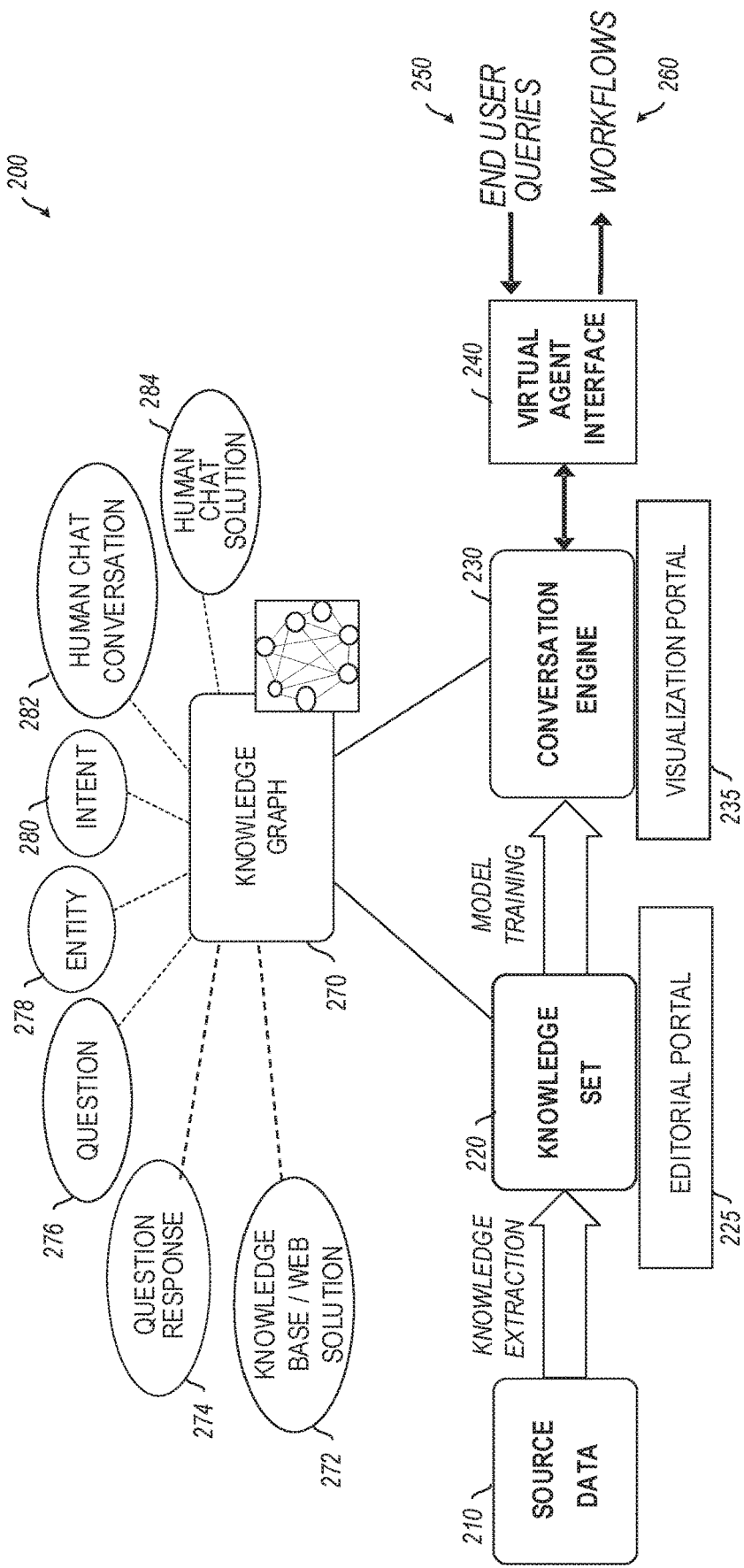
FIG. 2 depicts an operational flow diagram of a deployment of a knowledge set used in a virtual agent, according to an example.

FIG. 2 is an operational flow diagram illustrating an example deployment 200 of a knowledge set used in a virtual agent, such as with use of the conversation model 176 and online/offline processing depicted in FIG. 1. The operational deployment 200 depicts an operational sequence 210, 220, 230, 240, 250, 260 involving the creation and use of organized knowledge, and a data organization 270, 272, 274, 276, 278, 280, 282, 284, involving the creation of a data structure, termed as a knowledge graph 270, which is used to organize concepts.

In an example, source data 210 is unstructured data from a variety of sources (such as the previously described support data). A knowledge extraction process is operated on the source data 210 to produce an organized knowledge set 220. An editorial portal 225 may be used to allow the editing, selection, activation, or removal of particular knowledge data items by an editor, administrator, or other personnel. The data in the knowledge set 220 for a variety of associated issues or topics (sometimes called intents), such as support topics, is organized into a knowledge graph 270 as discussed below.

The knowledge set 220 is applied with model training, to enable a conversation engine 230 to operate with a conversation model (e.g., conversation model 176 referenced above). The conversation engine 230 dynamically selects appropriate inquiries, responses, and replies for the conversation with the human user, as the conversation engine 230 uses information on various topics stored in the knowledge graph 270. A visualization engine 235 may be used to allow visualization of conversations, inputs, outcomes, and other aspects of use of the conversation engine 230.

The virtual agent interface 240 is used to operate the conversation model in a human-agent input-output setting (also referred to as an interaction session). While the virtual agent interface 240 may be designed to perform a number of interaction outputs beyond targeted conversation model questions, the virtual agent interface 240 may specifically use the conversation engine 230 to receive and respond to end user queries 250 or statements (including answers, clarification questions, observations, etc.) from human users. The virtual agent interface 240 then may dynamically enact or control workflows 260 which are used to guide and control the conversation content and characteristics.

The knowledge graph 270 is shown as including linking to a number of data properties and attributes, relating to applicable content used in the conversation model 176. Such linking may involve relationships maintained among: knowledge content data 272, such as embodied by data from a knowledge base or web solution source; question response data 274, such as natural language responses to human questions; question data 276, such as embodied by natural language inquiries to a human; entity data 278, such as embodied by properties which tie specific actions or information to specific concepts in a conversation; intent data 280, such as embodied by properties which indicate a particular problem or issue or subject of the conversation; human chat conversation data 282, such as embodied by rules and properties which control how a conversation is performed; and human chat solution data 284, such as embodied by rules and properties which control how a solution is offered and provided in a conversation.

In an example, the operational deployment 200 may include multiple rounds of iterative knowledge mining, editing, and learning processing. For instance, iterative knowledge mining may be used to perform intent discovery in a workflow after chat transcript data is labeled (with human and machine efforts) into structured data. This workflow may first involve use of a machine to automatically group phrases labeled in a "problem" category, extract candidate phrases, and ultimately recommend intents. Human editors can then review the grouping results, make changes to the phrase/intent relationship, and change intent names or content based on machine recommendation results. The changes made by human editors can then be taken as input into the workflow, to perform a second round of processing in order to improve the quality of discovered intent. Additionally, although machine-based processes may be used to identify and establish many values in the operational deployment 200, the changes made by the human edits can be respected such that machines only make recommendations for data not covered by human editors. This process can repeat until the quality of intent discovery is sufficient. Accordingly, the operational deployment 200 may utilize automated and AI-enhanced techniques to assist human editors to perform tasks and work and to make decisions, within a variety of authoring and content management aspects.

Figure 3:
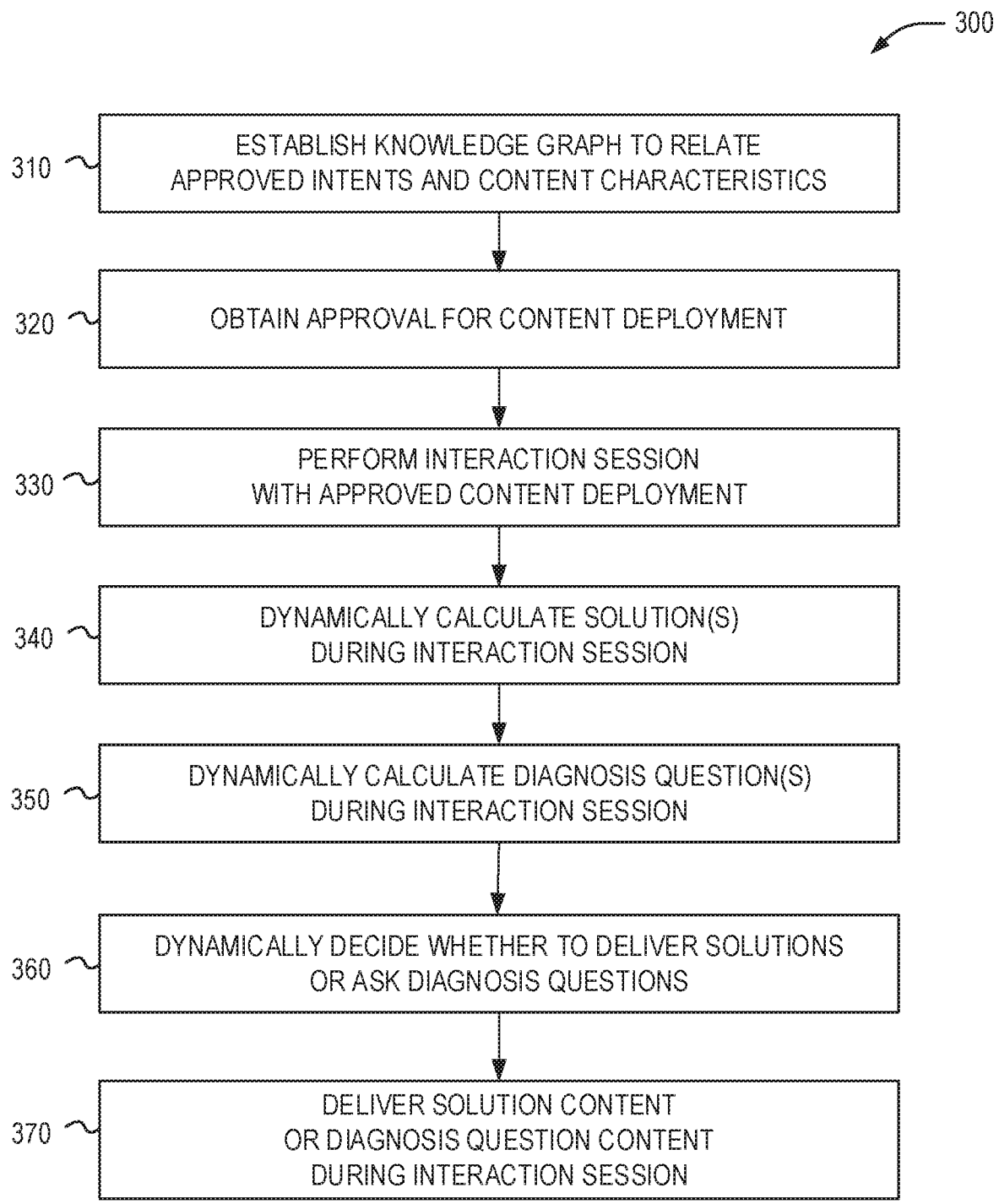
FIG. 3 depicts a flowchart of operations for a knowledge-driven dynamic conversation workflow with a virtual agent, according to an example.

FIG. 3 depicts a flowchart 300 for an example knowledge-driven dynamic conversation workflow with a virtual agent, according to an example. These operations are expanded upon by the accompanying operations and configurations illustrated in FIGS. 4A to 7. For instance, the operations in the flowchart 300 may represent aspects of the online processing, diagnosis and clarification identification, solution retrieval, and human-to-agent interaction, discussed in FIGS. 1 and 2, as applied in a customer service chat bot setting.

In operation 310, operations are performed to establish a knowledge graph to relate approved intents and content characteristics. This knowledge graph may be established as part of the offline processing operations discussed above for FIG. 1, and include the relationships of a developed knowledge graph as illustrated in FIG. 2. This is followed by a process, in operation 320, to obtain approval for a content deployment using the developed knowledge graph, and the commencing of a conversation workflow, in operation 330, to perform an interaction session with an approved content deployment.

The conversation workflow proceeds, in operation 340, to dynamically calculate one or more solutions during the interaction session, based on the inputs received from the user. As demonstrated in the illustrations of FIG. 4A-4D, this calculation may include dynamically calculated scores to help identify, confirm, or eliminate, one or more particular solutions. This is followed by the workflow proceeding, in operation 350, to dynamically calculate one or more diagnosis questions during the interaction session. As also demonstrated in the illustrations of FIG. 4A-4D, this calculation may include dynamically calculated scores to help identify, confirm, or eliminate, one or more diagnoses (and associated diagnosis questions and diagnosis statements). These calculations are used to dynamically decide whether to deliver one or more solutions or to ask one or more diagnosis questions, in operation 360, within the multi-turn conversation.

Finally, with use of clarification questions, answers, responses, queries, and observations in the multi-turn conversation, the most applicable solution may be identified. The conversation workflow may complete, in operation 370, by delivering content associated with the most applicable solution (e.g., a knowledge base article associated with the most highly scored solution; step-by-step instructions to attempt; information to complete a task; etc.). Although not shown, if a solution is not able to be identified, or if the solution does not reach a threshold score for presentation, then the support workflow may transition to a backup outcome, such as human agent assistance, a request for further information, or the like.

FIGS. 4A to 4D depict example user interfaces and data operations for identifying solutions and diagnoses, based on a conversation performed in a virtual agent. Specifically, FIGS. 4A to 4D include respective instances 410A, 410B, 410C, 410D of a user interface 410 to depict an ongoing conversation session 420 between a human user and a virtual chat bot agent.

Figure 4A:
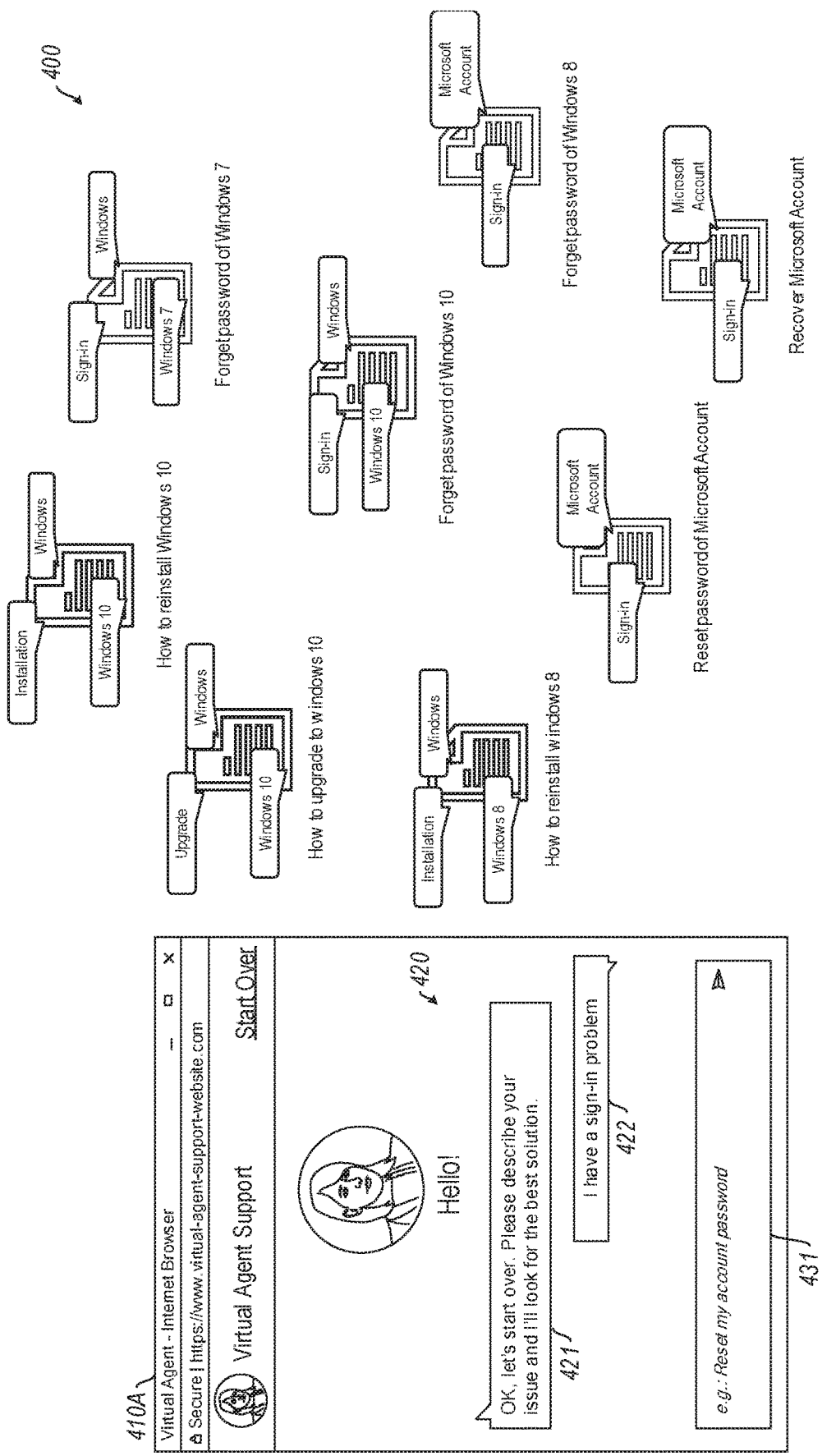

As shown, FIG. 4A depicts an instance 410A of the user interface, as presenting an agent introduction conversation statement 421, followed by receipt of a user query 422. The user query 422 may be in the form of a description, statement, question, complaint, or other text input by a human. The user query may include various queries, keywords, questions, prompts, or statements used to invoke a particular intent (e.g., "I need help with unlocking my computer"; or "How can I open my computer?"), including the use of particular trigger keywords or phrases that are tied to a particular intent. The relevant conversation content that is generated by the agent in response to the user query may include various questions, answers, clarification questions, clarification answers, solutions, or other content, provided as part of the conversation to address the particular intent. Additional information, further responses, clarification answers, follow-up questions, and the like, may be entered by the human user in the conversation entry input 431.

FIG. 4A also depicts a large number of potential solutions 400 which are potentially applicable to the conversation. Here, many different types of products and issues are included in the potential solutions 400. The conversation workflow provided by the KDD processes discussed herein may operate to gradually narrow the number of potential solutions 400 until a most applicable/best solution is identified. Specifically, the KDD processes are used to select relevant conversation content to output to a human user from the agent, based on a highest ranked diagnosis for a highest ranked solution. The selection of the diagnoses and solutions are also tied to an intent and entity properties, as discussed below.

Figure 4B:
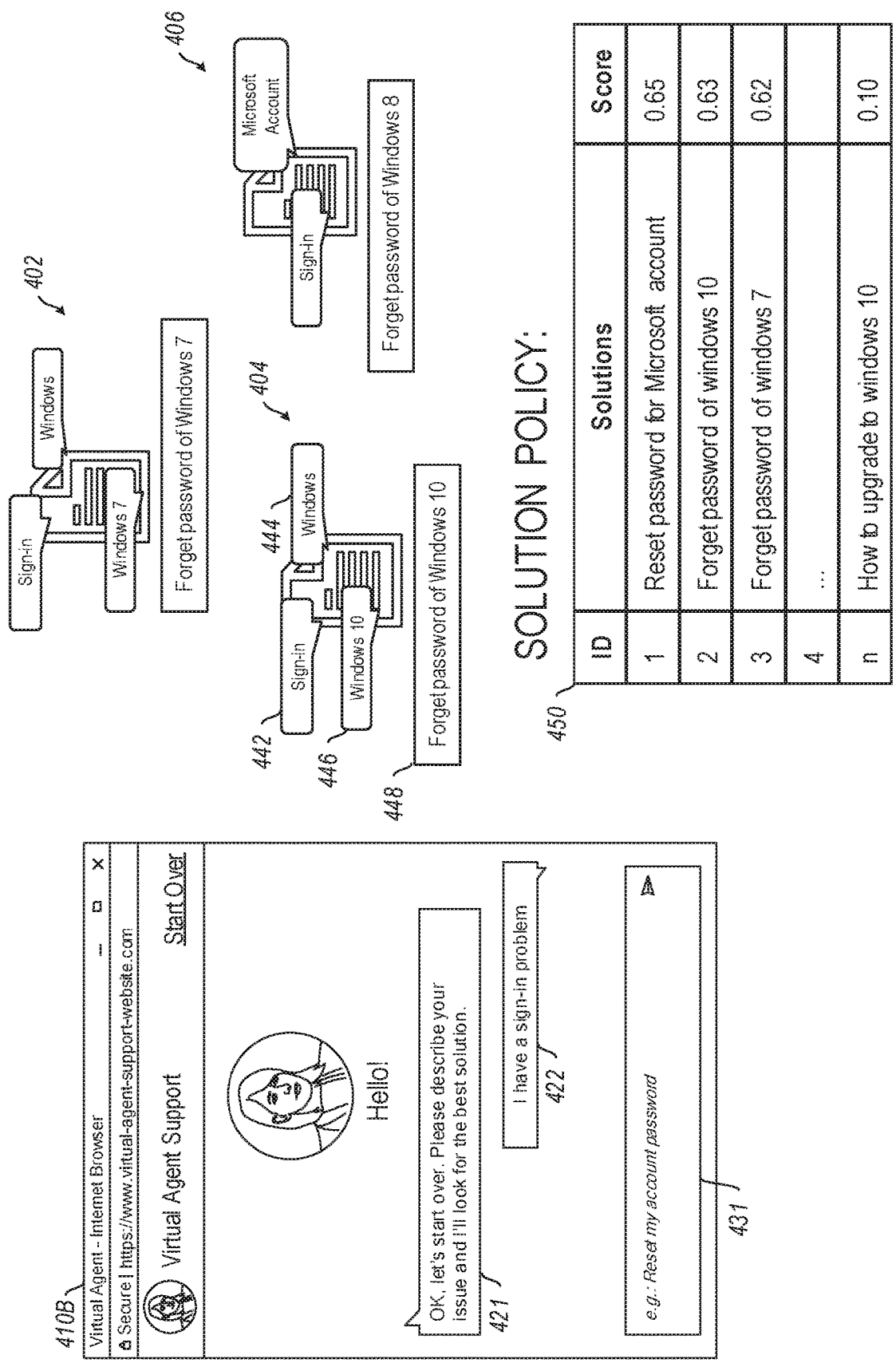

Next, FIG. 4B depicts an instance 410B of the user interface, as causing an identification of possible solutions in a solution policy 450, in response to the user query 422. However, due to the application of the solution policy 450, FIG. 4B depicts a smaller number of potential solutions than FIG. 4A, solutions 402, 404, 406, which are applicable to the conversation.

The solution policy 450 operates to narrow the number of potential solutions 400 until a most applicable, highest scored/ranked, or "best" solution is identified. In this example, the solution policy 450 is applied based on the semantic match of the user input, "I have a sign-in problem", to an intent, "Sign-in" offered by the solutions 402, 404, 406. In an example, the "semantic match" is conducted by an offline trained ranker model. The ranker model first identifies multiple channels of information from both user inputs and solutions contents potentially useful for the semantic match, including (1) similarity scores by a Deep Neural Network between the user input and each meta of solution contents, (2) BM25 scores between user input and each meta of solution contents, (3) overlap of key entities between user input and each meta of solution content. Then the model assembles all the above information and produce a single similarity score. In a further example, the solution policy 450 may also exclude those solutions with a relatively low score in comparison to the top scores, or those below a certain threshold.

Figure 4C:
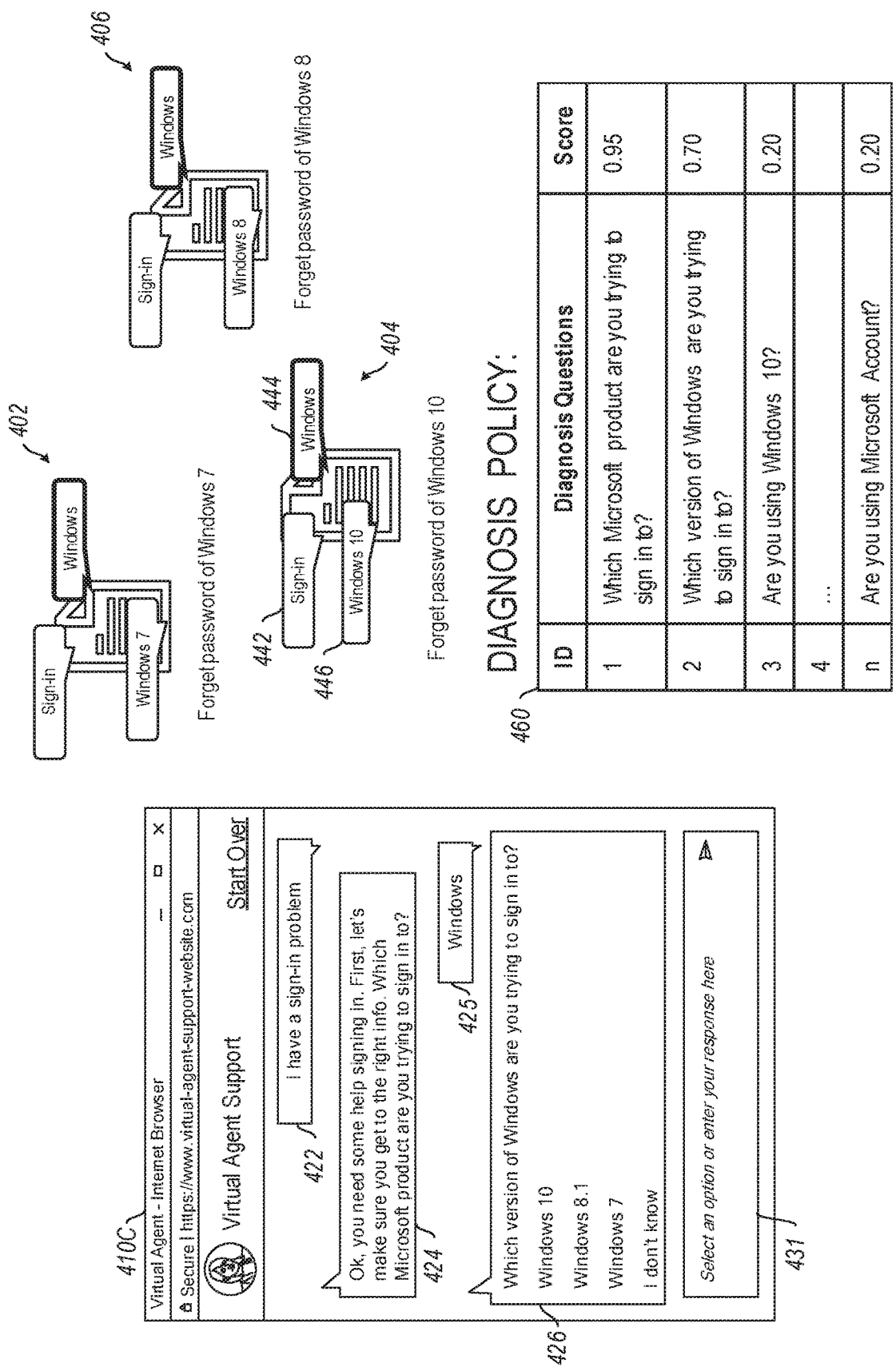

Next, FIG. 4C depicts an instance 410C of the user interface, as having output a further entity question 424 from the virtual agent, which asks for identification of additional information. This additional information is used to match certain entity properties, such as the entity property 444 ("Windows") associated with solution 404. However, because this entity property 444 is also shared with other solutions 402, 406, an additional entity question 426 is asked by the virtual agent. This additional entity question 426 is determined as a result of the diagnosis policy 460, which includes various diagnostic questions used to distinguish between the remaining available solutions (solutions 402, 404, 406).

The diagnosis policy 460 may be applied based on the user input and the current candidate solutions (the results of solution policy 450) to clarify. In an example, the policy first collects all possible questions related to the candidate solutions, which is provided from content authoring. Then, an offline trained question ranker model is applied to evaluate two aspects of scores: a score reflecting how smooth the question is considering the conversation history, and a score reflecting how effective the question is to clarify between the candidate solutions. The model will also combine these two scores and produce a single score (applying a trade-off between the scores).

Additionally, the diagnosis policy 460 may exclude those diagnosis questions with a relatively low score in comparison to the top scores, or those below a certain threshold. Accordingly, the diagnosis policy 460 is updated after each conversational exchange between the user and the agents, to dynamically re-score and re-evaluate further questions and outputs, as needed, to move towards an ultimate solution.

Finally, FIG. 4D also depicts an instance 410D of the user interface, as having output information 440 associated with a solution, and a follow-up query 428 asking whether the solution has been successful. This solution is indicated as having been selected in response to the human user providing a particular answer that corresponds to an entity ("Windows 10") associated with specific solution 404 ("Forgot password of Windows 10"), which eliminates the other considered solutions 402, 406. Here, the solution policy 470 has scored the specific solution with a much higher score than any other available solution. The identification of the solution may be based on the overall score exceeding a threshold, being a particular amount or percentage greater than another solution, or based on other scoring or determined characteristics.

Although FIGS. 4A to 4D only depict a small number of conversation interactions, it will be understood that a multi-turn conversation occurring with a KDD process may involve a far larger, or even smaller number, of queries, questions, answers, and statements (and applicable diagnoses and solutions). Other configurations, in which individual solutions are linked to multi-part solutions, and individual diagnoses are linked to multi-part diagnoses, may also be implemented with the present techniques.

Figure 5A:
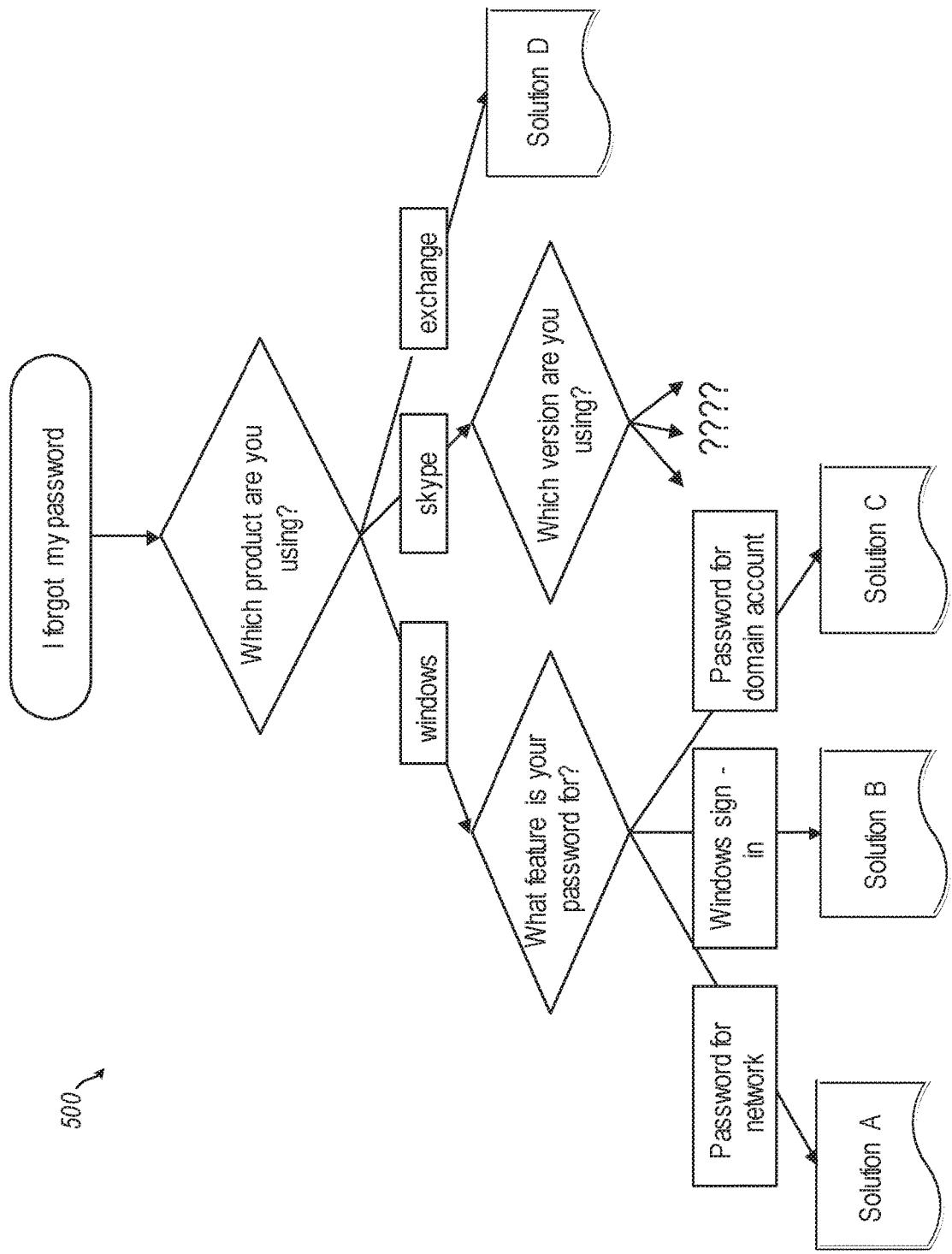
FIGS. 5A and 5B depict script-based and solution-based operation diagrams, representing pathways for conversations used in a virtual agent, according to an example.
Figure 5B:
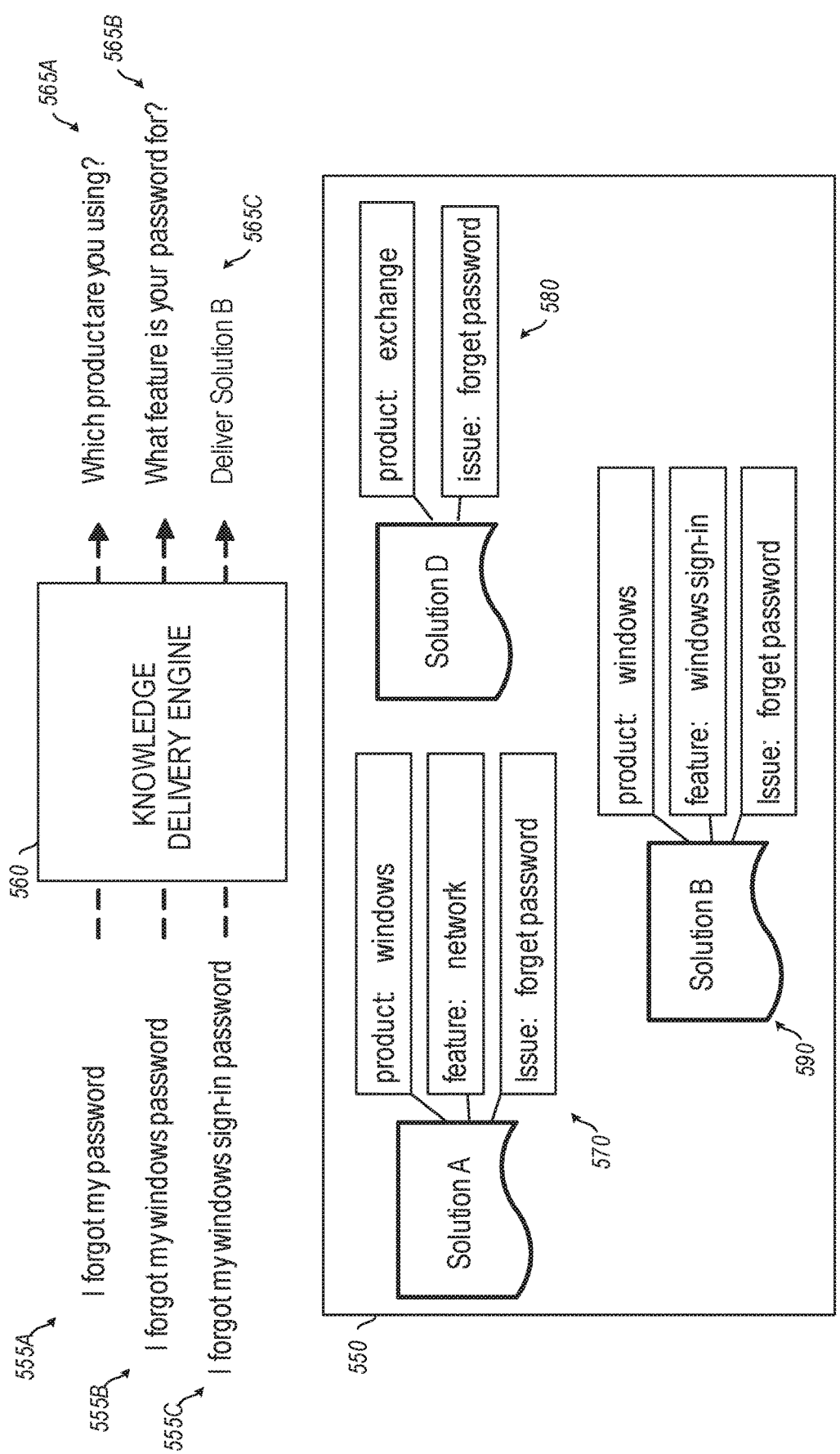

FIGS. 5A and 5B respectively depict a script-based operation diagram and a solution-based operation diagrams, representing pathways for conversations used in a virtual agent. The script-based operation diagram 500 in FIG. 5A includes an illustration of the various ways in which a query, questions, and answers lead to one of many possible solutions. The use of a dialog script in FIG. 5A begins with a series of fixed questions, as an agent manually decides to ask questions or return answers at each step of conversation. The structure and use of a prefixed dialog execution flow is costly to author and maintain, and leads to a very complex dialog script (and, often, unsuccessful support results).

The solution-based operation diagrams in FIG. 5B, implementing a KDD process, provide a different approach, illustrating how the knowledge delivery engine 560 operates to provide customized outputs based on the inputs. For instance, if user query 555A "I forgot my password" is provided, the knowledge delivery engine 560 asks a question 565A which helps to identify additional characteristics, namely, an applicable product. If, instead, the user query 555B "I forgot my windows password" is provided, then the knowledge delivery engine 560 will identify the applicable product characteristic ("Windows") and ask a question 565B specific to the product characteristic, thus limiting the question workflow and the type of solution to those associated with the product characteristic ("Windows", associated with solution A 570 and solution B 590, and not solution D 580). If, instead, the user query 555C "I forgot my windows sign-in password" is provided, then the knowledge delivery engine 560 will know the applicable product characteristic (windows) as well as the feature (windows sign-in), and deliver the solution 565C without needing to ask additional questions.

In this fashion, the knowledge delivery engine 560 does not need to have a full script pathway for every possible permutation, as individual user inputs are dynamically parsed for applicable intent characteristics and applicable entity properties. This allows the use of multiple types of entity properties to be defined for a given solution (e.g., both a product type and a product feature) selected from among the multiple available solutions 570, 580, 590. This also allows a workflow to be shortened and customized to the particular information provided by the user.

Figure 6:
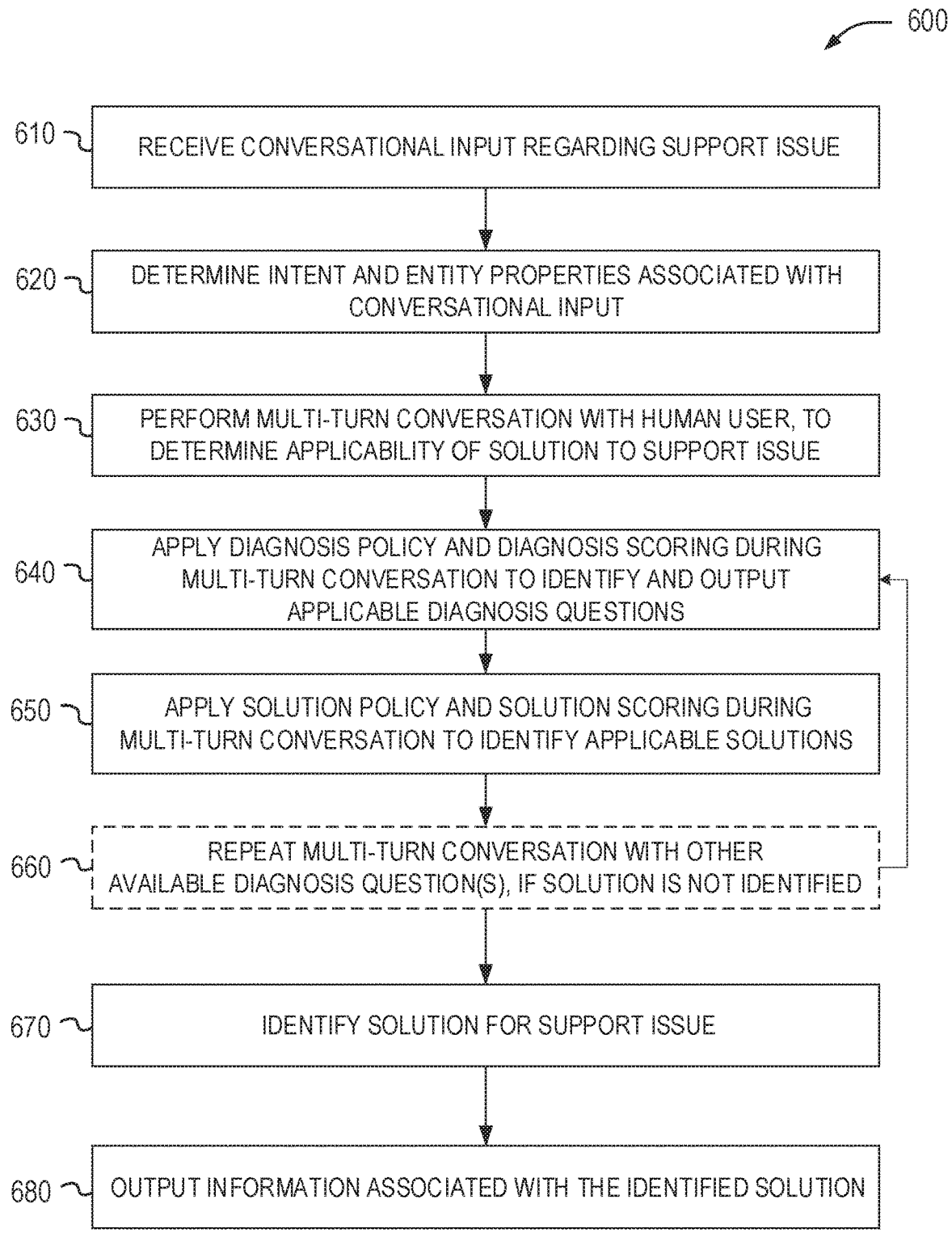
FIG. 6 depicts a flowchart of a method for performing knowledge-driven dynamic conversations in a virtual agent, using a solution-based knowledge delivery engine, according to an example.

FIG. 6 is a flowchart 600 of an example method to facilitate (e.g., conduct, coordinate, host, control, etc.) a knowledge-based conversation session with a human user using an automated agent as discussed herein. It will be understood that the operations of the flowchart 600 may be implemented in connection with a computer-implemented method, instructions on a computer program product, or with a configuration of a computing device (or among multiple of such methods, products, or computing devices). In an example, the electronic operations are performed by a computing device that includes at least one processor to perform electronic operations to implement the method. However, other variation in software and hardware implementations may also initiate, control, or accomplish the method.

As shown, the operations of the flowchart 600 include a workflow for a conversation session, including commencing at operation 610 to receive conversational input regarding a support issue. This conversation session may involve the use of a trained conversation model, conversation knowledge set, and information organized into a knowledge graph. In an example, the conversation model is adapted to conduct the conversation session to assist a technical support scenario with the human user, to process an intent expressed in the conversation session that relates to one or more support issues in the technical support scenario. Additionally, entity properties expressed in the conversation session may specify characteristics of a product or service involved with the support issues. As indicated with the examples above, this conversation session may be performed in a chat bot session in a computing user interface, although other form factors may also be used.

The workflow of flowchart 600 continues at operation 620 to determine intent and entity properties associated with the received conversational input. This may be performed by analyzing the conversational input with use of the conversation model 176 (see FIG. 1) and knowledge graph 270 (see FIG. 2). In an example, the entity properties associated with the intent include characteristics of at least one product or service and at least one product or service feature, to identify a solution that provides instructions (such as technical support instructions) specific to the at least one product or service and the at least one product or service feature. In a further example, the entity properties associated with the intent include at least one constraint, as the information provided by the human user in the conversation is used to determine the at least one constraint. Also in a further example, such constraints relate to a plurality of properties for a product or service, relating to one or more of: a product or service instance, a product or service type, a product or service version, a product or service release, a product or service feature, or a product or service use case. Likewise, in a further example, entity properties associated with the intent may define or be associated with characteristics of at least one product or service and at least one product or service feature, to help identify a solution that includes instructions specific to the at least one product or service and the at least one product or service feature.

The workflow of flowchart 600 also continues at operation 630 to perform a multi-turn conversation with the human user. The multi-turn conversation iteratively progresses to identify a solution using the intent and the applicable entity properties discussed between the human user and the automated agent. In an example, the multi-turn conversation includes iterative questions and answers exchanged between the automated agent and the human user that are employed to dynamically recalculate applicability of the solution to the support issue (e.g., to recalculate after each conversation exchange). For instance, the multi-turn conversation may facilitate further conversational input from the human user, to determine the intent from among a plurality of intents and the applicable entity properties from among a plurality of entities. As the multi-turn conversation progresses, other intents and other entity properties that are not applicable are excluded from consideration.

In an example, the multi-turn conversation involves the application of a diagnosis policy and diagnosis scoring, during the multi-turn conversation, at operation 640. This scoring may be used to determine the applicability of a particular solution or sets of solutions to a support issue, based on scoring of the plurality of diagnosis questions (and the use of scoring calculations, thresholds, minimums, etc.). This scoring may be used to exclude the use of irrelevant diagnosis questions, and to identify the most relevant diagnosis question (or sets of diagnosis questions) to ask. In a further example, the diagnosis question is selected from a plurality of applicable diagnosis questions, based on an applicability score of the diagnosis question that is determined for each of the plurality of applicable diagnosis questions. This applicability score may be based on matching of the intent and entity properties to information provided from human user in the multi-turn conversation.

In an example, the multi-turn conversation also involves the application of a solution policy and solution scoring, during the multi-turn conversation, at operation 650. This scoring may be used to identify possible solutions from a plurality of solutions, based on scoring of the plurality of solutions (and the use of scoring calculations, thresholds, minimums, etc.). This scoring may be used to exclude the use of irrelevant solutions and diagnosis questions or responses, and to identify the most likely solution (or set of solutions) to present.

The multi-turn conversation may also involve providing further questions and answers (and present further diagnosis questions), at operation 660, if a solution is not identified according to the solution policy. In some examples, such as where limited information is provided, this may involve repeating the operations 640 and 650 for a further set of diagnosis questions and analysis of applicable solutions.

Based on the diagnosis policy and the solution policy, the multi-turn conversation may be used to guide the participants to discuss sufficient information to identify a solution. This results in identifying a solution for the support issue, at operation 670. Then, the flowchart 600 concludes as the information associated with the identified solution is output to the human user in the conversation session (e.g., via audio, display, tactile feedback, or the like), at operation 680. Although not depicted, these operations may also occur in connection with information exchanged in multiple conversations, multiple conversation sessions, or conversations among multiple users.

Figure 7:
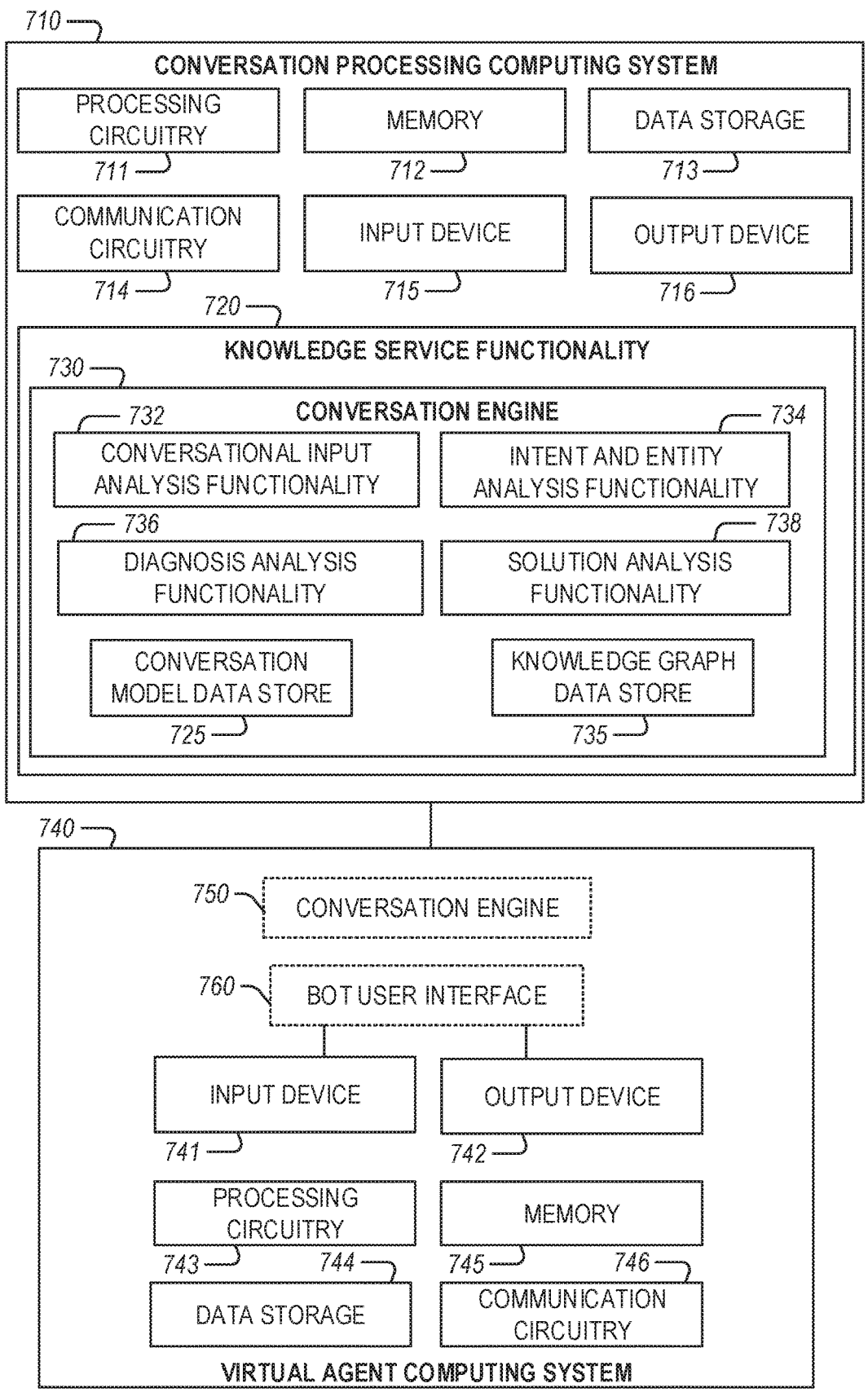
FIG. 7 depicts a block diagram of hardware and functional components of a system to implement operations for performing knowledge-driven dynamic conversations in a virtual agent, using a solution-based knowledge delivery engine, according to an example.

FIG. 7 illustrates a block diagram 700 of hardware and functional components of a conversation processing computing system 710 and a virtual agent computing system 740 to implement aspects of deployment and use of a knowledge-driven conversation model for automated agents, such as are accomplished with the examples described above. It will be understood, that although certain hardware and functional components are depicted in FIG. 7 and in other drawings as separate systems or components, the features of the components may be integrated into a single system or service (e.g., in a single computing platform providing online processing workflows and a user interface for conducting a conversation session). Further, although only one conversation processing computing system and one virtual agent computing system is depicted, it will be understood that the features of these systems may be distributed among one or multiple computing systems, including in cloud-based processing settings.

As shown, the conversation processing computing system 710 includes processing circuitry 711 (e.g., a CPU) and a memory 712 (e.g., volatile or non-volatile memory) used to perform electronic operations (e.g., via instructions) to facilitate a knowledge-based conversation session with a human user using an automated agent (e.g., by implementing the online human-agent conversation processing techniques depicted in FIGS. 1-6); data storage 713 to store commands, instructions, and other data for use and operation of the conversation session; communication circuitry 714 to communicate with an external network or devices via wired or wireless networking components for the conversation session operations; an input device 715 (e.g., an alphanumeric, point-based, tactile, audio input device) to receive input from a human user (including an end user or an administrative user) for control or configuration of the conversation session or conversation processing operations; and an output device 716 (e.g., visual, acoustic, haptic output device) to provide output to the human user (including the end user or the administrative user) relating to the conversation processing operations or implementation in a interaction or knowledge service.

In an example, the conversation processing computing system 710 is adapted to operate aspects of conversation engine functionality 7230, within an knowledge service platform 720 (e.g., implemented by circuitry or software instructions), such as through: conversational input analysis functionality 732 used to analyze and evaluate conversational input from a human as part of the conversation workflows discussed herein; intent and entity analysis functionality 734 used to identify, match, and handle intent and entity properties from inputs received in the conversation workflows; diagnosis analysis functionality 736, used to implement a dynamic diagnosis policy and identify further diagnosis questions in the conversation workflows; and solution analysis functionality 738, used to implement a dynamic solution policy and identify solution outcomes in the conversation workflows. The conversation engine 730 may perform these and other conversational (question, answer, response, and other content) functions through the use of a conversation model data store 725 and a knowledge graph data store 735, including from conversation model and knowledge graph data designed during AI-assisted authoring workflows. Although FIG. 7 depicts the execution of the components 730, 732, 734, 736, 738 within the same computing system 710, it will be understood that these components may be executed on other computing systems, including multiple computing systems as orchestrated in a server-based (e.g., cloud) deployment.

As shown, the virtual agent computing system 740 includes processing circuitry 743 (e.g., a CPU) and a memory 745 (e.g., volatile or non-volatile memory) used to perform electronic operations (e.g., via instructions) for providing conversation functionality in a virtual agent setting, such as to exchange conversation utterances and text with the conversation engine 739 (e.g., in connection with the knowledge-driven conversation workflows discussed with reference to FIGS. 1-6). The virtual agent computing system 740 further includes an input device to receive or provide conversational input from a human user; an output device 742 to output or provide conversational output to the human user; data storage 744 to store commands, instructions, and other data for the virtual agent operations; and communication circuitry 746 to communicate with an external network or devices via wired or wireless networking components for the conversation operations.

In an example, the virtual agent computing system 740 includes a bot user interface 760 (e.g., an audio, text, graphical, or virtual reality interface, etc.) that is adapted to expose the features of the virtual agent to a human user, and to facilitate the conversation from a trained conversation model (e.g., a model operated by the conversation engine 730). The operation of the bot user interface 760 may occur through use of other systems, administrators, or a human user, including in internet-based hosted and remotely deployed settings. Other variations to the roles and operations performed by the virtual agent computing system 740 and the conversation processing computing system 710 may also implement the conversation workflow and model authoring and use techniques discussed herein.

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols).

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, 4G LTE/LTE-A, 5G, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
   a processor; and
   a memory device including instructions embodied thereon, wherein the instructions, when executed by the processor, cause the processor to perform operations to facilitate a knowledge-based conversation session with a human user using an automated agent, the operations comprising:
   receiving, from the human user in the conversation session, a conversational input regarding a support issue;
   analyzing the conversational input to determine an intent and applicable entity properties associated with the intent;
   performing a multi-turn conversation with the human user in the conversation session including:
      scoring a plurality of solutions based on the intent and the applicable entity properties;
      identifying at least two possible solutions from a plurality of solutions based on respective scores of the at least two possible solutions exceeding a threshold;
      in response to identifying the at least two possible solutions, outputting diagnosis questions to the human user in the conversation session based on a diagnosis policy;
      receiving responses to the diagnosis questions;
      recalculating the respective scores of the at least two possible solutions to the support issue based on the responses; and
      identifying a solution from the at least two possible solutions based on the respective scores;
   updating the diagnosis policy based on the responses in the conversation session; and
   outputting, to the human user in the conversation session, information associated with the identified solution.

2. The computing device of claim 1, wherein the multi-turn conversation provides further conversational input from the human user, used to determine the intent from among a plurality of intents and the applicable entity properties from among a plurality of entities, wherein the multi-turn conversation is used to exclude other intents of the plurality of intents and other entity properties of the plurality of entities.

3. The computing device of claim 1, wherein performing the multi-turn conversation with the human user includes:
   applying a solution policy to identify at least two possible solutions from a plurality of solutions, based on scoring of the plurality of solutions; and
   wherein the solution policy applies the scoring to exclude use of other solutions from the plurality of solutions.

4. The computing device of claim 1, wherein performing the multi-turn conversation with the human user includes:
   applying the diagnosis policy to identify at least two possible diagnosis questions from a plurality of diagnosis questions, based on scoring of the plurality of diagnosis questions;
   wherein the diagnosis policy applies the scoring to exclude use of other diagnosis questions from the plurality of diagnosis questions.

5. The computing device of claim 1, wherein performing the multi-turn conversation with the human user includes use of a diagnosis question, by:
   selecting the diagnosis question from a plurality of applicable diagnosis questions, wherein the diagnosis question is selected based on an applicability score of the diagnosis question, the applicability score being determined for each of the plurality of applicable diagnosis questions based on matching of the intent and entity properties to information provided from human user in the multi-turn conversation;
   outputting the diagnosis question in the multi-turn conversation; and
   analyzing a response to the diagnosis question, by receiving a conversational response to the diagnosis question and evaluating the conversational response;
   wherein, based on the evaluating, the multi-turn conversation identifies the solution, or repeats the selecting, output, and analyzing of another diagnosis question.

6. The computing device of claim 1, wherein the entity properties associated with the intent include at least one constraint, wherein the information provided by the human user in the conversational input and in the multi-turn conversation are used to determine the at least one constraint, and wherein the constraints relate to a plurality of properties for a product, relating to one or more of: a product instance, a product type, a product version, a product release, a product feature, or a product use case.

7. The computing device of claim 1, wherein the entity properties associated with the intent include characteristics of at least one product and at least one product feature, wherein the identified solution includes instructions specific to the at least one product and the at least one product feature.

8. The computing device of claim 1, wherein the multi-turn conversation is performed using information from a knowledge graph of a conversation model, wherein the knowledge graph specifies relationships among the intent, the entity properties, and the identified solution.

9. The computing device of claim 8, wherein the conversation model is adapted to conduct the conversation session to assist a technical support scenario with the human user, wherein the intent expressed in the conversation session relates to one or more support issues in the technical support scenario, and wherein the entity properties expressed in the conversation session specify characteristics of a product or service involved with the support issues.

10. The computing device of claim 1, wherein the conversation session is performed in a text chat bot session within a computing user interface.

11. A non-transitory machine-readable storage medium, the machine-readable storage medium including instructions that, when executed by a processor and memory of a machine, causes the machine to perform operations to facilitate a knowledge-based conversation session with a human user using an automated agent, the operations comprising:
  receiving, from the human user in the conversation session, a conversational input regarding a support issue;
  analyzing the conversational input to determine an intent and applicable entity properties associated with the intent;
  performing a multi-turn conversation with the human user in the conversation session including:
    scoring a plurality of solutions based on the intent and the applicable entity properties;
    identifying at least two possible solutions from a plurality of solutions based on respective scores of the at least two possible solutions exceeding a threshold;
    in response to identifying the at least two possible solutions, outputting diagnosis questions to the human user in the conversation session based on a diagnosis policy;
    receiving responses to the diagnosis questions;
    recalculating the respective scores of the at least two possible solutions to the support issue based on the responses; and
    identifying a solution from the at least two possible solutions based on the respective scores;
  updating the diagnosis policy based on the responses in the conversation session; and
  outputting, to the human user in the conversation session, information associated with the identified solution.

12. The machine-readable storage medium of claim 11, wherein the multi-turn conversation provides further conversational input from the human user, used to determine the intent from among a plurality of intents and the applicable entity properties from among a plurality of entities, wherein the multi-turn conversation is used to exclude other intents of the plurality of intents and other entity properties of the plurality of entities.

13. The machine-readable storage medium of claim 11, wherein performing the multi-turn conversation with the human user includes:
  applying a solution policy to identify at least two possible solutions from a plurality of solutions, based on scoring of the plurality of solutions; and
  wherein the solution policy applies the scoring to exclude use of other solutions from the plurality of solutions.

14. The machine-readable storage medium of claim 11, wherein performing the multi-turn conversation with the human user includes:
  applying a diagnosis policy to identify at least two possible diagnosis questions from a plurality of diagnosis questions, based on scoring of the plurality of diagnosis questions;
  wherein the diagnosis policy applies the scoring to exclude use of other diagnosis questions from the plurality of diagnosis questions.

15. The machine-readable storage medium of claim 11, wherein performing the multi-turn conversation with the human user includes use of a diagnosis question, by:
  selecting the diagnosis question from a plurality of applicable diagnosis questions, wherein the diagnosis question is selected based on an applicability score of the diagnosis question, the applicability score being determined for each of the plurality of applicable diagnosis questions based on matching of the intent and entity properties to information provided from human user in the multi-turn conversation;
  outputting the diagnosis question in the multi-turn conversation; and
  analyzing a response to the diagnosis question, by receiving a conversational response to the diagnosis question and evaluating the conversational response;
  wherein, based on the evaluating, the multi-turn conversation identifies the solution, or repeats the selecting, output, and analyzing of another diagnosis question.

16. A method to facilitate a knowledge-based conversation session with a human user using an automated agent, comprising a plurality of operations executed with a processor and memory of a computing device, the plurality of operations comprising:
  receiving, from the human user in the conversation session, a conversational input regarding a support issue;
  analyzing the conversational input to determine an intent and applicable entity properties associated with the intent;
  performing a multi-turn conversation with the human user in the conversation session including:
    scoring a plurality of solutions based on the intent and the applicable entity properties;
    identifying at least two possible solutions from a plurality of solutions based on respective scores of the at least two possible solutions exceeding a threshold;
    in response to identifying the at least two possible solutions, outputting diagnosis questions to the human user in the conversation session based on a diagnosis policy;
    receiving responses to the diagnosis questions;
    recalculating the respective scores of the at least two possible solutions to the support issue based on the responses; and
    identifying a solution from the at least two possible solutions based on the respective scores;

updating the diagnosis policy based on the responses in the conversation session; and outputting, to the human user in the conversation session, information associated with the identified solution.

17. The method of claim 16, wherein the multi-turn conversation provides further conversational input from the human user, used to determine the intent from among a plurality of intents and the applicable entity properties from among a plurality of entities, wherein the multi-turn conversation is used to exclude other intents of the plurality of intents and other entity properties of the plurality of entities.

18. The method of claim 16, wherein performing the multi-turn conversation with the human user includes:

applying a solution policy to identify at least two possible solutions from a plurality of solutions, based on scoring of the plurality of solutions; and wherein the solution policy applies the scoring to exclude use of other solutions from the plurality of solutions.

19. The method of claim 16, wherein performing the multi-turn conversation with the human user includes:

applying a diagnosis policy to identify at least two possible diagnosis questions from a plurality of diagnosis questions, based on scoring of the plurality of diagnosis questions;

wherein the diagnosis policy applies the scoring to exclude use of other diagnosis questions from the plurality of diagnosis questions.

20. The method of claim 16, wherein performing the multi-turn conversation with the human user includes use of a diagnosis question, by:

selecting the diagnosis question from a plurality of applicable diagnosis questions, wherein the diagnosis question is selected based on an applicability score of the diagnosis question, the applicability score being determined for each of the plurality of applicable diagnosis questions based on matching of the intent and entity properties to information provided from human user in the multi-turn conversation;

outputting the diagnosis question in the multi-turn conversation; and analyzing a response to the diagnosis question, by receiving a conversational response to the diagnosis question and evaluating the conversational response;

wherein, based on the evaluating, the multi-turn conversation identifies the solution, or repeats the selecting, output, and analyzing of another diagnosis question.

* * * * *